United States Patent
Yeh et al.

(10) Patent No.: US 7,711,059 B2
(45) Date of Patent: May 4, 2010

(54) LOW NOISE INTER-SYMBOL AND INTER-CARRIER INTERFERENCE CANCELLATION FOR MULTI-CARRIER MODULATION RECEIVERS

(75) Inventors: Heng-Cheng Yeh, Taipei (TW); Chia-Liang Lin, Union City, CA (US)

(73) Assignee: Realtek Semiconductor Corp. (TW)

( * ) Notice: Subject to any disclaimer, the term of this patent is extended or adjusted under 35 U.S.C. 154(b) by 864 days.

(21) Appl. No.: 11/465,081

(22) Filed: Aug. 16, 2006

(65) Prior Publication Data

US 2007/0053453 A1    Mar. 8, 2007

Related U.S. Application Data

(60) Provisional application No. 60/596,200, filed on Sep. 8, 2005.

(51) Int. Cl.
    H04K 1/10    (2006.01)
(52) U.S. Cl. .................. 375/260; 375/262; 375/299; 375/341; 375/346; 375/348; 375/349
(58) Field of Classification Search .............. 375/260, 375/262, 299, 341, 346, 348, 349
    See application file for complete search history.

(56) References Cited

U.S. PATENT DOCUMENTS

| | | | |
|---|---|---|---|
| 6,014,412 A | 1/2000 | Wiese et al. | |
| 6,130,922 A | 10/2000 | Stott et al. | |
| 6,243,414 B1 * | 6/2001 | Drucker et al. | 375/222 |
| 6,389,062 B1 | 5/2002 | Wu | |
| 6,999,508 B1 | 2/2006 | Redfern | |
| 2003/0067865 A1 * | 4/2003 | Gross et al. | 370/203 |
| 2004/0264587 A1 | 12/2004 | Morejon et al. | |

(Continued)

OTHER PUBLICATIONS

Arslan, G. , et al., "Equalization for Discrete Multitone Transceivers to Maximize Bit Rate", *IEEE Transaactions on Signal Processing*, 49(12), (Dec. 12, 2001), pp. 3123-3135.

(Continued)

*Primary Examiner*—Shuwang Liu
*Assistant Examiner*—Kabir A Timory
(74) *Attorney, Agent, or Firm*—Schwegman, Lundberg & Woessner, P.A.

(57) ABSTRACT

A MCM (multi-carrier modulation) receiver that utilizes a plurality sub-carriers (e.g., tones) to transmit information in a frame-by-frame manner. Identify a first subset of sub-carriers that have negligible ISI (inter-symbol interference) and ICI (inter-carrier interference), and a second subset of sub-carriers that ISI/ICI cancellation is needed to improve the performance. For sub-carriers in the first subset, conventional equalization is performed to obtained soft decisions. For those sub-carriers in the second subset, perform ISI cancellation then ICI cancellation along with equalization. For sub-carriers in the second subset, identify a series of third subsets (one for each of the sub-carriers in the second subset) that cause interference to the sub-carriers in the second set. For sub-carriers in the third subset, identify a series of fourth subsets from a previous frame that cause interference to the sub-carriers in the third set. For each element in the third subset, perform ISI cancellation to eliminate the interference from the elements in the fourth subset from the previous frame to obtain a plurality of intermediate decisions. For each element in the second subset, perform a combined equalization and ICI cancellation using said intermediate decisions. The selection of the first subset, the second subset, the third subset, and the fourth subset are based on examining the frequency response of the communication channel.

25 Claims, 9 Drawing Sheets

U.S. PATENT DOCUMENTS

2005/0084005 A1    4/2005  Mujica et al.
2006/0153283 A1*   7/2006  Scharf et al. ............ 375/148
2007/0019746 A1    1/2007  Lin et al.

OTHER PUBLICATIONS

Trautmann, S., et al., "Frequency Domain Equalization of DMT/OFDM Systems", *IEEE*, #0-7803-7400-2/02, (2002), pp. 1646-1650.

Wolf, Martin J., et al., "A New Phenomenon Observed in Conection with Determining the FEQ of DMT Transceivers with Insufficient Guard Interval", *IEEE* 0-7803-8379-6/04/$20.00, (2004), pp. 389-392.

Yeh, Heng-Cheng, et al., "Frequency Domain Echo Cancellation for Discrete Multitone Systems", *ISSPIT-IEEE, Rome*, (Dec. 2004), 4 pages.

* cited by examiner

US 7,711,059 B2

LOW NOISE INTER-SYMBOL AND INTER-CARRIER INTERFERENCE CANCELLATION FOR MULTI-CARRIER MODULATION RECEIVERS

CROSS-REFERENCE TO RELATED PATENT APPLICATION

This patent application claims the priority benefits of U.S. provisional application titled "Low noise inter-symbol and inter-carrier interference cancellation for multi-carrier modulation receivers" filed on Sep. 8, 2005, Ser. No. 60/596,200, the entire disclosure of which is incorporated herein by reference. This patent application is also related to U.S. patent application Ser. No. 11/256,707 filed Oct. 24, 2005, titled "Inter-Symbol and Inter-Carrier Interference Canceller for Multi-Carrier Modulation Receiver," by inventors Chia-Liang Lin, Heng-Cheng Yeh and Cheng-Hsian Li, the entire subject matter of which is incorporated herein by reference.

COPYRIGHT NOTICE

This patent document contains copyrightable subject matter that may include (by way of example and not by way of limitation) computer software elements, source code, flow charts, screen displays, and other copyrightable subject matter. The following notice shall apply to these elements: Copyright © 2005 Real Communications, Inc., San Jose, Calif. All rights reserved.

LIMITED WAIVER OF COPYRIGHT

In accordance with 37 CFR section 1.71(e), a portion of the disclosure of this patent document may contain material to which a claim for copyright is made. The copyright owner has no objection to the facsimile reproduction by anyone of the patent document or the patent disclosure as it appears in the United States Patent and Trademark Office patent file or records, as long as the above Copyright Notice remains legible on all copies. The copyright owner reserves all other national and international copyright rights.

BACKGROUND OF THE INVENTION

1. Field of the Invention

The present invention relates to multi-carrier modulation receivers, in particular to apparatus and methods of canceling the inter-symbol and inter-carrier interference in a multi-carrier modulation receiver.

2. Description of Related Art

MCM (multi-carrier modulation) is a modulation scheme that is widely used in high-speed data communications. It has two flavors: OFDM (orthogonal frequency division multiplexing), which is currently used in wireless local area network standards IEEE 802.11a and 802.11g, and DMT (discrete multi-tone), which is currently used in ADSL (asymmetrical digital subscriber line) standards and VDSL (very-high-speed digital subscriber line) standards. While the DMT system is discussed throughout the specification and is used as an example, one of ordinary skill in the art will realize that the techniques disclosed by the present invention are applicable to a general MCM system.

A DMT transmitter utilizes a plurality of tones, (or so-called sub-carriers, which are sinusoidal waves), which are orthogonal to one another. Each tone may carry a certain bit-load of information using a certain modulation scheme, such as 4-QAM (4-point quadrature amplitude modulation, which carries 2-bit information), 16-QAM (16-point quadrature amplitude modulation, which carries 4-bit information), 64-QAM (64-point quadrature amplitude modulation, which carries 6-bit information), and so on. The total bit loads provided by all the tones determines the total number of data bits that a DMT symbol carries. For example, if there are 256 tones and each of them uses 16-QAM, then the total amount of data a DMT symbol carries is 256×4=1024 bits. A DMT transmission system thus operates on a per-frame basis. Each frame consists of a block of data bit stream whose length is equal to the total number of bits that a DMT symbol carries. For example, if each DMT symbol carries 1024 bits, then the data to be transmitted from the transmitter are divided into many blocks; each block has 1024 bits and is carried by a DMT symbol.

FIG. 1 depicts a typical block diagram of the physical layer implementation of a DMT transmitter 1000. A SIPO (serial-in parallel-out) buffer 1100 converts a block of data bit stream (that a DMT symbol carries) into N parallel data banks, labeled 0, 1, 2, to N−1. Each entry of the N banks is mapped into a respective QAM (quadrature amplitude modulation) constellation point by the subsequent QAM mapper 1200, resulting in N complex (frequency domain) data, labeled 0, 1, 2, to N−1. A constellation diagram is a representation of a digital modulation scheme in the complex plane. The points on a constellation diagram are called constellation points. Constellation points are a set of modulation symbols that comprise a modulation alphabet.

For example, if tone number 5 uses 4-QAM to carry two bits of information, the QAM mapper 1200 will map the two-bit input corresponding to tone number 5 into one of the four constellation points: 1+j, 1−j, −1+j, −1−j. The N complex data from QAM mapper 1200 are converted into N time-domain samples by N-point IFFT (inverse Fast Fourier Transform) 1300. The last N_CP time-domain samples of the IFFT output are pre-pended to the beginning of the N samples, resulting in N+N_CP time-domain samples, labeled 0, 1, 2, to N+N_CP−1. These N_CP pre-pended samples are referred to as "cyclic prefix" (CP) of the corresponding IFFT frame. A subsequent PISO (parallel-in serial-out) buffer 1500 converts the N+N_CP time domain samples into N+N_CP serial samples, which is converted into analog voltage by a DAC (digital-analog converter) 1600. An amplifier 1700 amplifies the output from DAC 1600 to make it suitable for transmission over the communication medium 2020 (for example, communication lines such as telephone lines). The N+N_CP serial samples constitute a DMT symbol that carries a certain block of information.

FIG. 2 illustrates the construction of two successive DMT symbols. The last N_CP samples of the IFFT output corresponding to the first block of data bit stream are pre-pended to the beginning of the first DMT symbol. Similarly, the last N_CP samples of the IFFT output corresponding to the second block of data bit stream are pre-pended to the beginning of the second DMT symbol. "Cyclic prefix" carries redundant information that is readily available. However, it provides a "guard interval" that serves as a buffer between two successive DMT symbols. Without the guard interval, the information carried by the $1^{st}$ DMT symbol will leak to the $2^{nd}$ DMT symbol and causes interference when the two successive DMT symbols are transmitted over the communication channel 2020, since every practical communication channel has a non-zero length in its impulse response. When a CP is employed with a length is longer than the impulse response of the communication channel, the leakage of the information carried by the first DMT symbol will be contained within the guard interval between the two DMT symbols. The CP, however, is an overhead to the system. A longer CP allows the system to tolerate more dispersion from the communication channel at the cost of a lower data throughput.

FIG. 3 depicts a typical block diagram of a DMT receiver. The received signal from the communication medium 2020 is amplified by an amplifier 2050, then filtered by a filter 2100, and then converted into digital samples by a ADC (analog-digital converter) 2200. As mentioned above, the cyclic prefix in the transmitter needs to be longer than the length of the impulse response of the communication channel 2020 for the leakage of information from one DMT symbol to be contained within the guard interval. In practice, however, the impulse response of the communication channel may be longer than the CP because the CP is usually not long enough (otherwise the sacrifice in data throughput will be prohibitively high). Therefore, a TEQ 2300 (time-domain equalizer) is often used. TEQ 2300 is essentially a FIR (finite impulse response) filter whose purpose is to effectively shorten the impulse response of the communication channel, so that the leakage of the information from one DMT symbol can be contained within the guard interval.

From the output of the TEQ 2300, the frame boundary between two successive DMT symbols is detected. The output of TEQ 2300 is then converted by a SIPO (serial-in parallel-out) 2400 into successive blocks of time domain samples; each block consists of N+N_CP time-domain samples, labeled 0, 1, 2, . . . , N+N_CP−1. The $1^{st}$ N_CP samples of each frame, which corresponds to the samples within the guard interval, are discarded in the subsequent CP removal 2500, resulting in N samples, labeled 0, 1, 2, to N−1. The N time-domain samples are transformed into N frequency-domain samples by the N-point FFT (fast Fourier transform) 2600.

Ideally, we would like the N frequency-domain samples at the output of FFT 2600 to exactly match the N frequency-domain data at the input of IFFT 1300 in the transmitter depicted by FIG. 1. Unfortunately, due to the communication channel, the amplitude and phase of each sub-carrier is altered and therefore the frequency domain sample at the receiver will not exactly match that at the transmitter. A FEQ (frequency domain equalizer) 2700 is used to equalize the frequency-domain samples. The amplitude and phase change experienced by each tone is thus corrected independently on a per-tone basis. After frequency domain equalization, a slicer 2750 is used to decide the most likely constellation point that the transmitter originally uses for each tone. For example, if the output of FEQ 2700 is 0.9+1.1j for tone number 5 which uses 4-QAM to carry two-bit information, then slicer 2750 would decide that the most likely constellation point that the transmitter originally uses for tone number 5 is 1+1j. The slicer is an example embodiment of a "decision device," as it makes a most likely decision for each tone. The output from slicer 2750 is mapped to N data banks by the subsequent "QAM demapper" 2800. The N data banks from "QAM demapper" 2800 are converted back into a block of data bit stream by PISO 2900, which ideally will match that of the input of SIPO 1100 in the transmitter.

To effectively shorten the length of the effective impulse response of the communication channel, many algorithms for calculating the coefficients for TEQ are proposed, including minimum mean square error (MMSE), maximum shortening SNR (MSSNR), minimum ISI (mini-ISI), and maximum bit rate (MBR). Among these, MBR offers the best performance, but the computation complexity is too high to be implemented in a commercial MCM receiver. In many cases, unfortunately, none of the algorithms are able to lead to a practical solution that completely contains the leakage of the information from a DMT symbol within the guard interval (i.e. CP of the next DMT symbol). Under these circumstances, a DMT symbol causes interference to the next DMT symbol. This phenomenon is known as "inter-symbol interference" (ISI).

When the length of impulse response of the communication channel exceeds the CP length, a DMT symbol will fail to settle into steady state within its guard interval (i.e. the CP portion of this DMT symbol). In other words, there is still some transient behavior within the "useful" part, i.e. the last N samples, of the DMT symbol. DMT modulation, as a special of MCM, relies on the orthogonality of carriers to faithfully deliver the information. The orthogonality between two tones holds only when they are both in steady state, where both become purely sinusoidal. Whenever the DMT symbol fails to settle into steady state within its guard interval, the orthogonality among tones used by this DMT symbol fails. There is then coupling between the information carried by any two tones that it uses. This phenomenon is known as "inter-carrier interference" (ICI).

One way to alleviate the ISI/ICI problem is to employ multiple TEQ's (time-domain equalizers). For example, a dual-TEQ architecture is shown in FIG. 4. This receiver divides the tones into two groups and employs TEQ1 and TEQ2. Each TEQ is optimized to minimize the ISI/ICI for one group of tones. Each TEQ output is converted into frequency domain samples in a respective FFT. On a per-tone basis, this receiver determines which output of the two paths yields the best SNR (signal-noise ratio). Once the better path for each tone is determined, the output from the path is equalized by the subsequent FEQ. A drawback for this type of receiver is that the hardware cost of this architecture is rather high.

Another way to alleviate the ISI/ICI problem is to employ a so-called "per-tone frequency domain equalizer" (PTFEQ), as shown in FIG. 5. The principle in this design is to eliminate TEQ by replacing it with a plurality of tapped delay lines 5010 in the frequency domain at the FFT output. The hardware cost, however, is prohibitively high for a commercial MCM receiver.

U.S. patent application Ser. No. 11/256,707 filed Oct. 24, 2005, titled "Inter-Symbol and Inter-Carrier Interference Canceller for Multi-Carrier Modulation Receiver," by inventors Chia-Liang Lin, Heng-Cheng Yeh and Cheng-Hsian Li, taught a cost effective method for performing ISI/ICI cancellation. However, in that scheme, the inputs to the ICI canceller contain ISI, therefore, there are certain interplays between ICI and ISI. Also, the method of finding the ISI/ICI coefficients taught in that application is based on LMS (least mean square) adaptation, which can be prone to noise and may take a long time to converge, given that the coefficients can only be adapted once per DMT symbol and each DMT period is usually relatively long.

There remains a need in the art for a low-cost, robust, and effective scheme for performing ISI/ICI cancellation.

SUMMARY

The present invention includes methods, devices and systems for minimizing or canceling inter-symbol interface and inter-carrier interface in multi-carrier modulation (MCM) receivers that utilize a plurality sub-carriers to transmit information. In an embodiment of the present invention, a first subset of sub-carriers that have negligible ISI (inter-symbol interference) and ICI (inter-carrier interference) is identified. A second subset of sub-carriers in which ISI/ICI cancellation is needed to improve the performance is identified. For sub-carriers in the first subset, equalization is performed to obtained soft decisions from raw decisions. For sub-carriers in the second subset, equalization is performed along with ICI/ISI cancellation. For sub-carriers in the second subset, a third subset (one for each of the sub-carriers in the second subset) is identified to perform ICI cancellation. A series of fourth subsets (one for each of the sub-carriers in the third subset) is identified to perform ISI cancellation.

In embodiments of the present invention, the selection of the first subset, the second subset, the third subset (for each of the sub-carriers in the second subset), and the fourth subset (for each of the sub-carriers in the third subset) are based on examining the frequency response of the communication channel. The first subset usually consists of the sub-carriers residing in the frequency range where the response of the communication channel varies smoothly with frequency. The second subset consists of sub-carriers that are usually in the proximity of abrupt transition in the frequency response of the communication channel. For each sub-carriers in the second subset, the third subset (for each of the sub-carriers in the second subset) includes its image tone, a few neighboring sub-carriers along with their images, and a few empty sub-carriers along with their images. For each sub-carriers in the third subset, the fourth subset (for each of the sub-carriers in the second subset) includes the sub-carriers itself along with its image, a few neighboring sub-carriers along with their images, and a few empty sub-carriers along with their images. The cancellation of ISI and ICI is performed separately so as to minimize the cross-coupling and to enhance cancellation. The FEQ/IC (frequency domain equalizer/interference canceller/slicer) coefficients for each sub-carriers are obtained through channel identification during the initial training, and by minimizing the root mean square error between the hard decision and the soft decision of that particular sub-carriers.

These and other embodiments, aspects, advantages, and features of the present invention, as well as various methods for producing, forming, and assembling the devices, circuitry, apparatus, software, hardware, and systems described, will be set forth in the detailed description which follows. Other aspects and features will also become apparent to those skilled in the art after due study of the drawings included herein, and a review of the detailed description, as well as by the practice of the invention. Such aspects, advantages, and features of the invention are realized and attained by exercising the instrumentalities, procedures, and combinations particularly pointed out in the appended claims.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
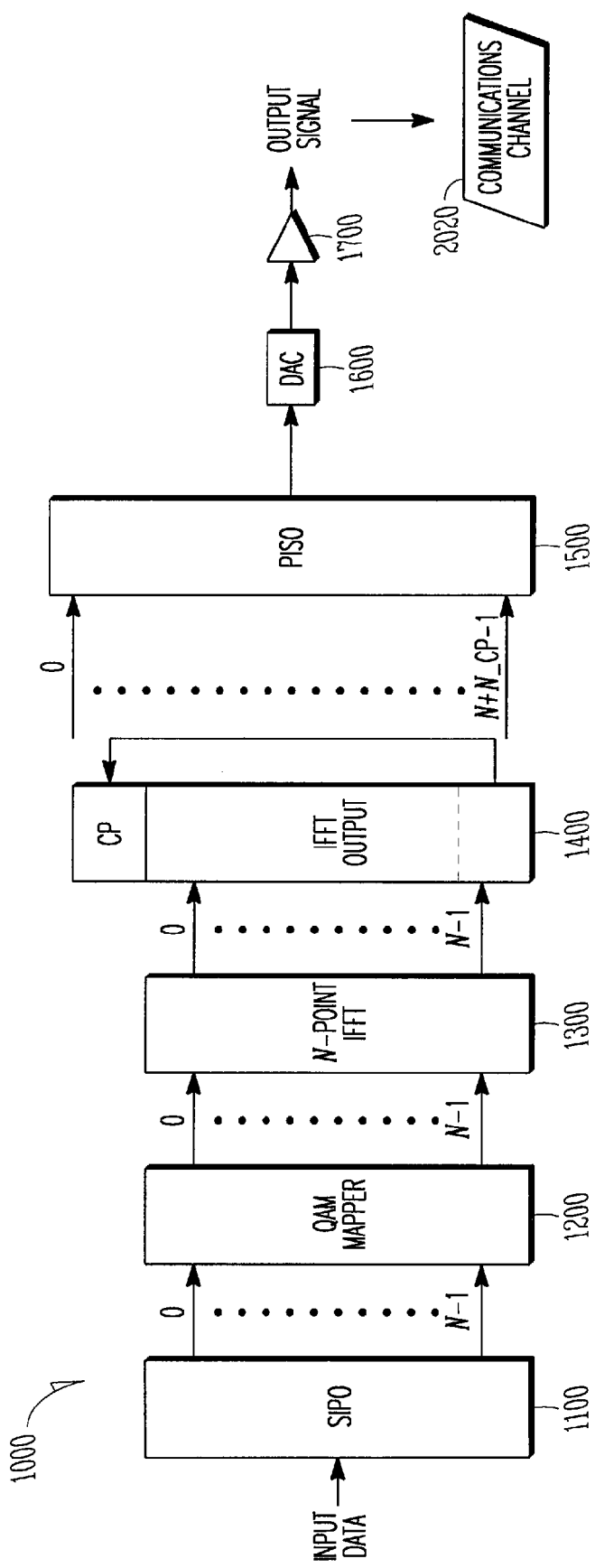
FIG. 1 is a block diagram of a prior art Discrete Multi-Tone (DMT) transmitter.
Figure 2:
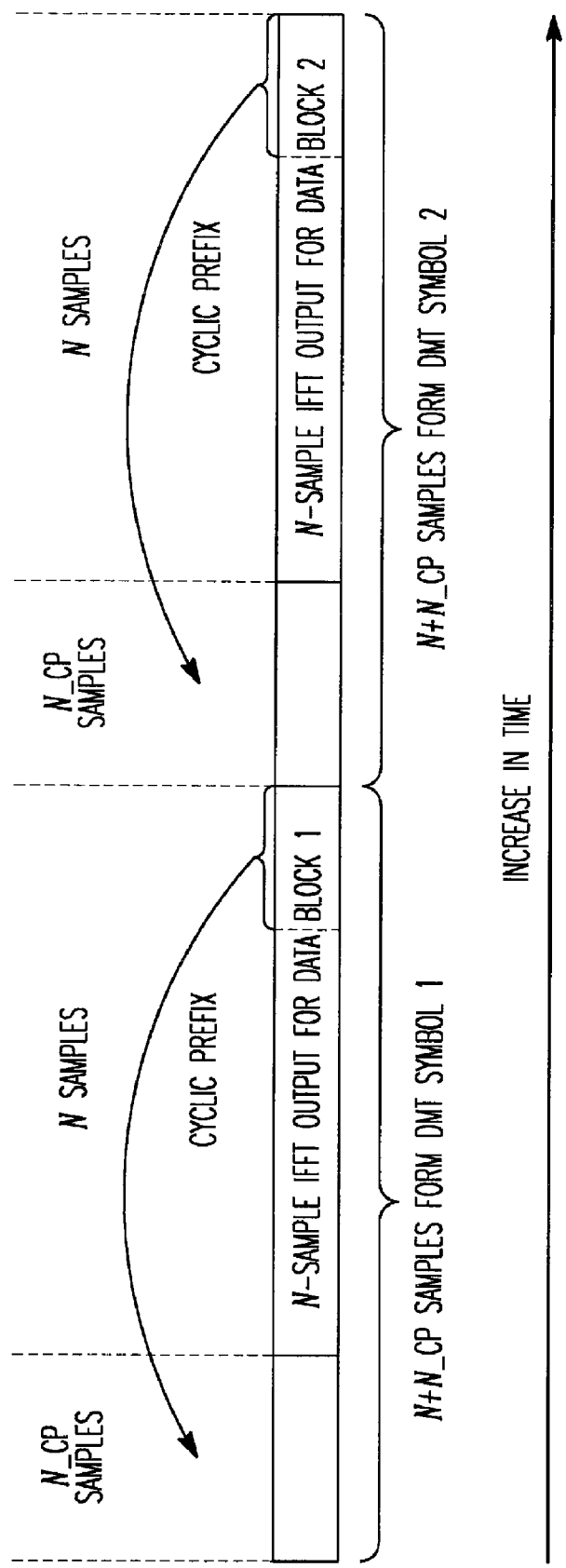
FIG. 2 illustrates a two successive DMT symbols.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration. While the specification described several example embodiments of the invention considered best modes of practicing the invention, it should be understood that the invention can be implemented in many ways and is not limited to the particular examples described below or to the particular manner in which any features of such examples are implemented.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present invention relates to a scheme of canceling the ISI/ICI for a MCM receiver. While the specification described several example embodiments of the invention considered best modes of practicing the invention, it should be understood that the invention can be implemented in many ways and is not limited to the particular examples described below or to the particular manner in which any features of such examples are implemented.

Figure 3:
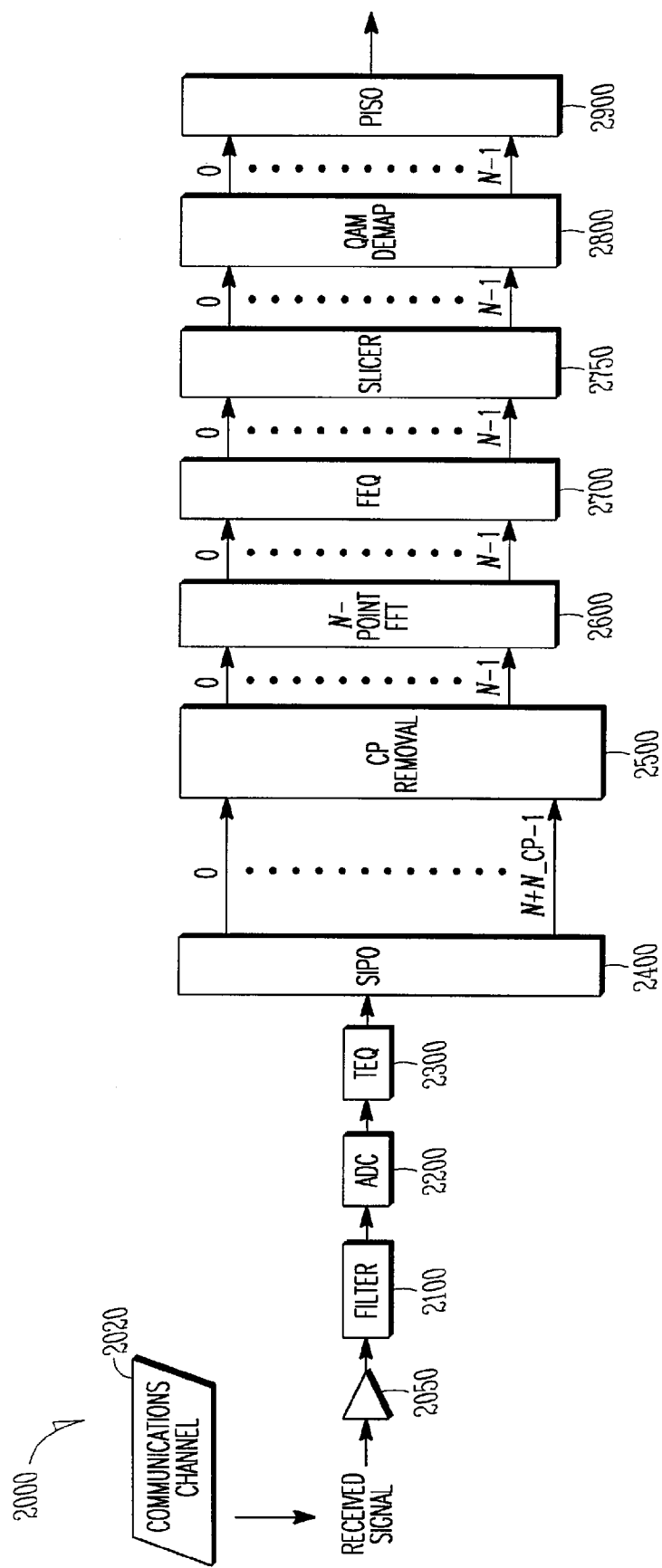
FIG. 3 is a block diagram of a prior art DMT receiver.
Figure 4:
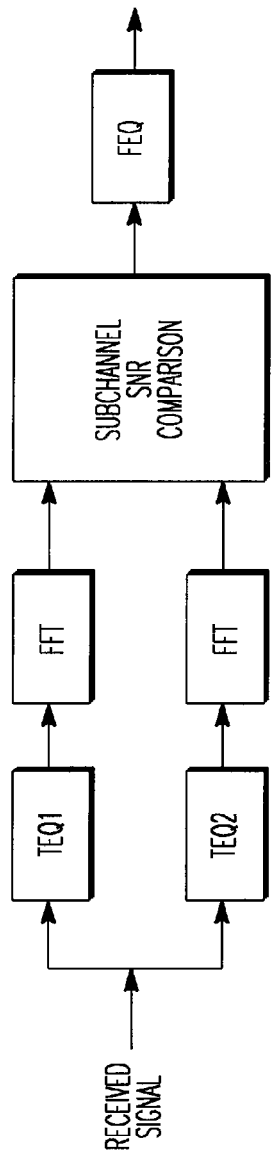
FIG. 4 is a block diagram of a prior art dual-path Time-domain Equalizer (TEQ) architecture.
Figure 5:
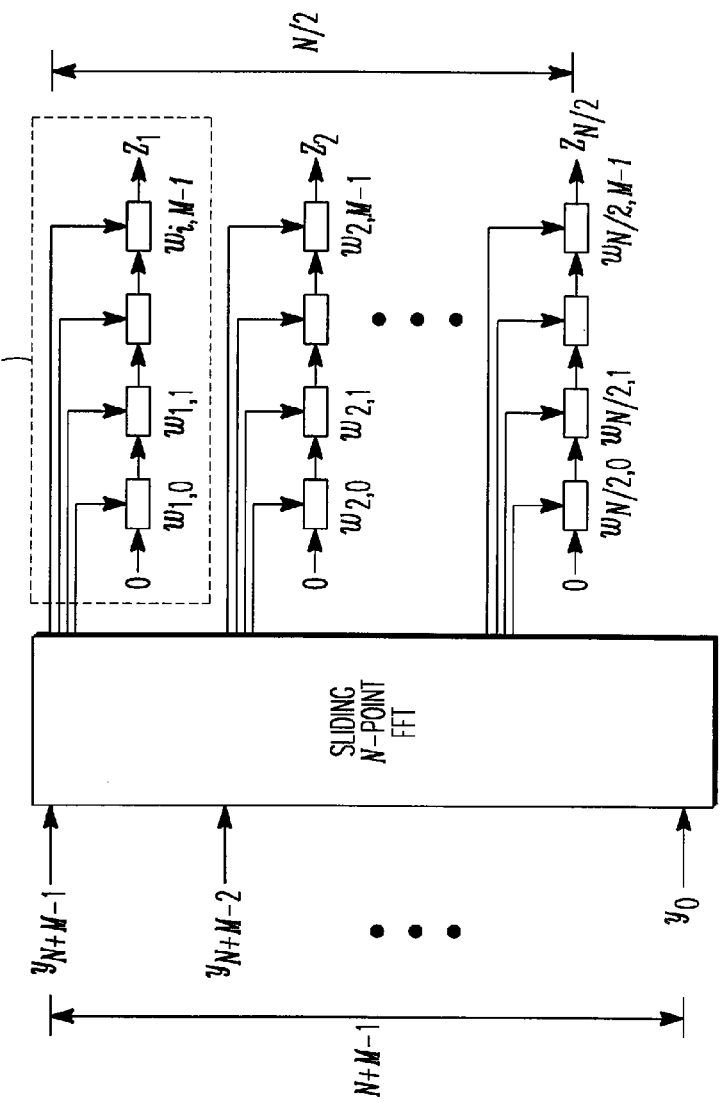
FIG. 5 is a block diagram of a prior art Per-Tone Frequency Domain Equalizer (PTFEQ) architecture.

Let the effective impulse response of the communication channel 2020 (including the path from the output of PISO 1500 in FIG. 1 to the input of SIPO 2400 of the receiver in FIGS. 3 and 6) be represented by a FIR (finite impulse response) filter which has $L_p$-taps of precursor and $L_c$-taps of post-cursor. Mathematically, we may write the effective impulse response as:

$$c = [c_{-L_p} \ldots c_{-2} c_{-1} c_0 c_1 c_2 \ldots c_{L_c}]^T$$

On the receiver side, a DMT symbol will be affected by its preceding symbol due to the post-cursor (of the effective impulse response), and also by its subsequent symbol due to the precursor. Usually, the precursor is relatively short and low in total energy and thus can be neglected. By artificially adjusting the symbol boundary, the effect of the precursor can be contained within the guard interval and thus will not cause interference to the preceding symbol. In accordance with some embodiments of the present invention, we use the information in current DMT symbol and that in the preceding symbol to remove the detrimental effects of ISI/ICI.

Figure 6:
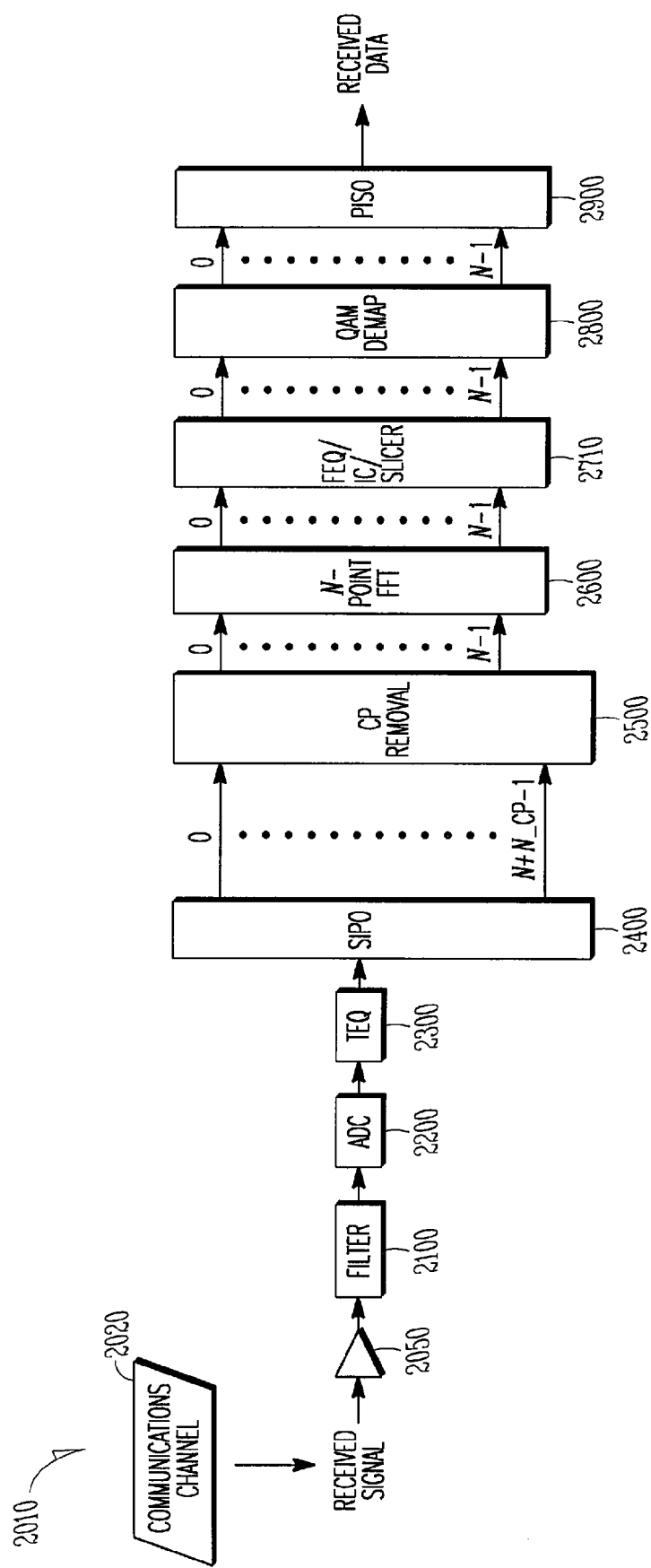
FIG. 6 is a block diagram of an exemplary embodiment of the present invention of implementing a Frequency-domain Equalizer/Interference Canceller/slicer (FEQ/IC/slicer) included in a DMT receiver.

FIG. 6 is a block diagram of an exemplary Discrete Multi-Tone (DMT) Receiver 2010 in accordance with various embodiments of the present invention. It is the same general architecture as the prior art receiver shown in FIG. 3 except that the FEQ 2700 and slicer 2750 are replaced by FEQ/IC/slicer (frequency domain equalizer/interference canceller/slicer) 2710.

Figure 7:
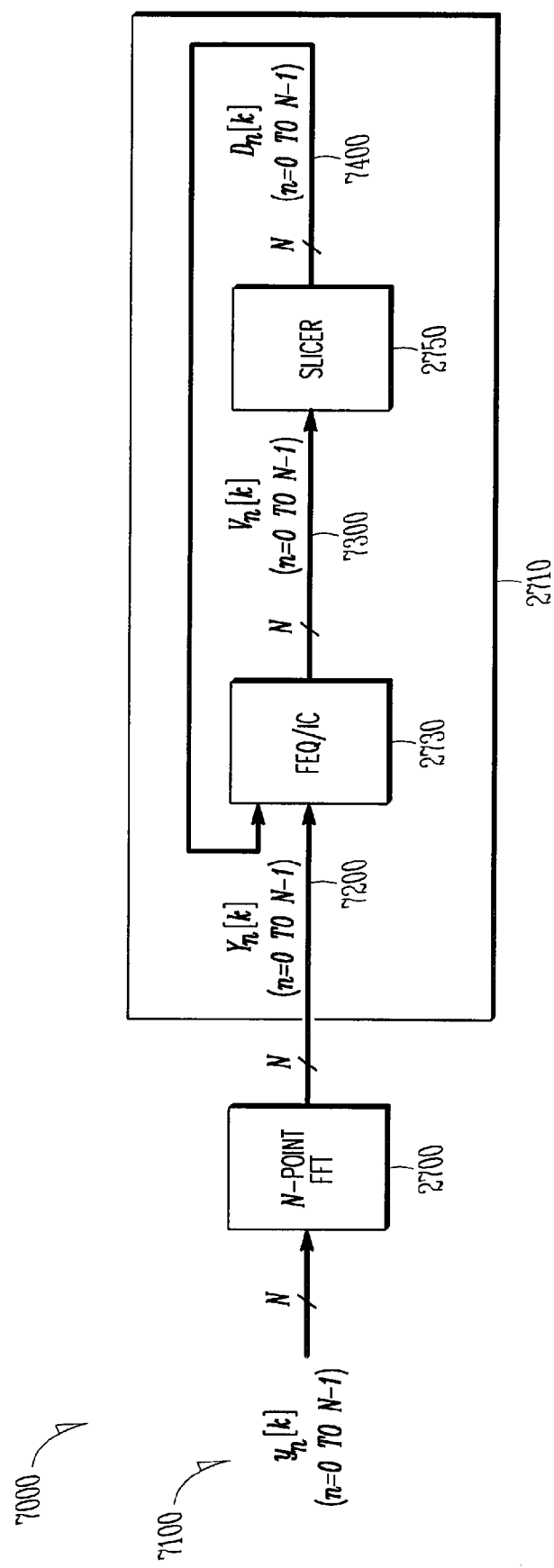
FIG. 7 is a block diagram illustrating an exemplary embodiment of an FEQ/IC/slicer.

FIG. 7 shows an exemplary top-level functional block diagram 7000 of FEQ/IC/Slicer 2710, including FEQ/IC block 2730 and slicer 2750. In FIG. 7, $y_n[k]$ (for n=0 to N−1) represent N time-domain samples 7100 for DMT symbol k, where k=1 corresponds to the first DMT symbol, k=2 corresponds to the second DMT symbol, and so on. The N-point FFT 2700 transforms the time domain samples $y_n[k]$ into frequency domain samples $Y_n[k]$ (for n=0 to N−1), labeled as 7200, which are referred to as "raw decisions" $Y_n[k]$. FEQ/IC block 2730 processes frequency domain samples 7200 to produce output $V_n[k]$ (for n=0 to N−1), which are referred to as "soft decisions" 7300. Further detail regarding the processing within FEQ/IC block 2730 is described below in connection with FIGS. 8-10.

Referring once again to FIG. 7, the soft decisions 7300 are applied to slicer 2750. As described above, slicer (or decision device) 2750 determines the most likely constellation point for each sub-carrier (e.g., a tone) and generates outputs $D_n[k]$ (for n=0 to N−1) which are referred to as "hard decisions" 7400. The hard decisions from slicer 2750 are provided to QAM demapper 2800, as shown in FIG. 6. The present description uses the term "tone" to describe the sub-carrier. Accordingly, "tone" is one specific embodiment of a sub-carrier. Returning to FIG. 7, in some embodiments, hard decisions $D_n[k]$ (for n=0 to N−1), labeled 7400, are fed back into the FEQ/IC block 2730, wherein the fed back hard decisions 7400 are used to remove interference of the DMT symbol k or in subsequent symbols.

While the functional description for FEQ/IC (Frequency Equalization/Interference Cancellation) herein appears similar as that disclosed in U.S. Ser. No. 11/256,707 filed Oct. 24, 2005, titled "Inter-Symbol and Inter-Carrier Interference Canceller for Multi-Carrier Modulation Receiver," the detailed operation within FEQ/IC is different. Briefly, in the '707 application, the functions of FEQ, ISI cancellation, and ICI cancellation are perform simultaneously; in this present invention, however, we perform ISI cancellation first to obtain better intermediate results, then we perform FEQ/ICI-cancellation accordingly.

Figure 8:
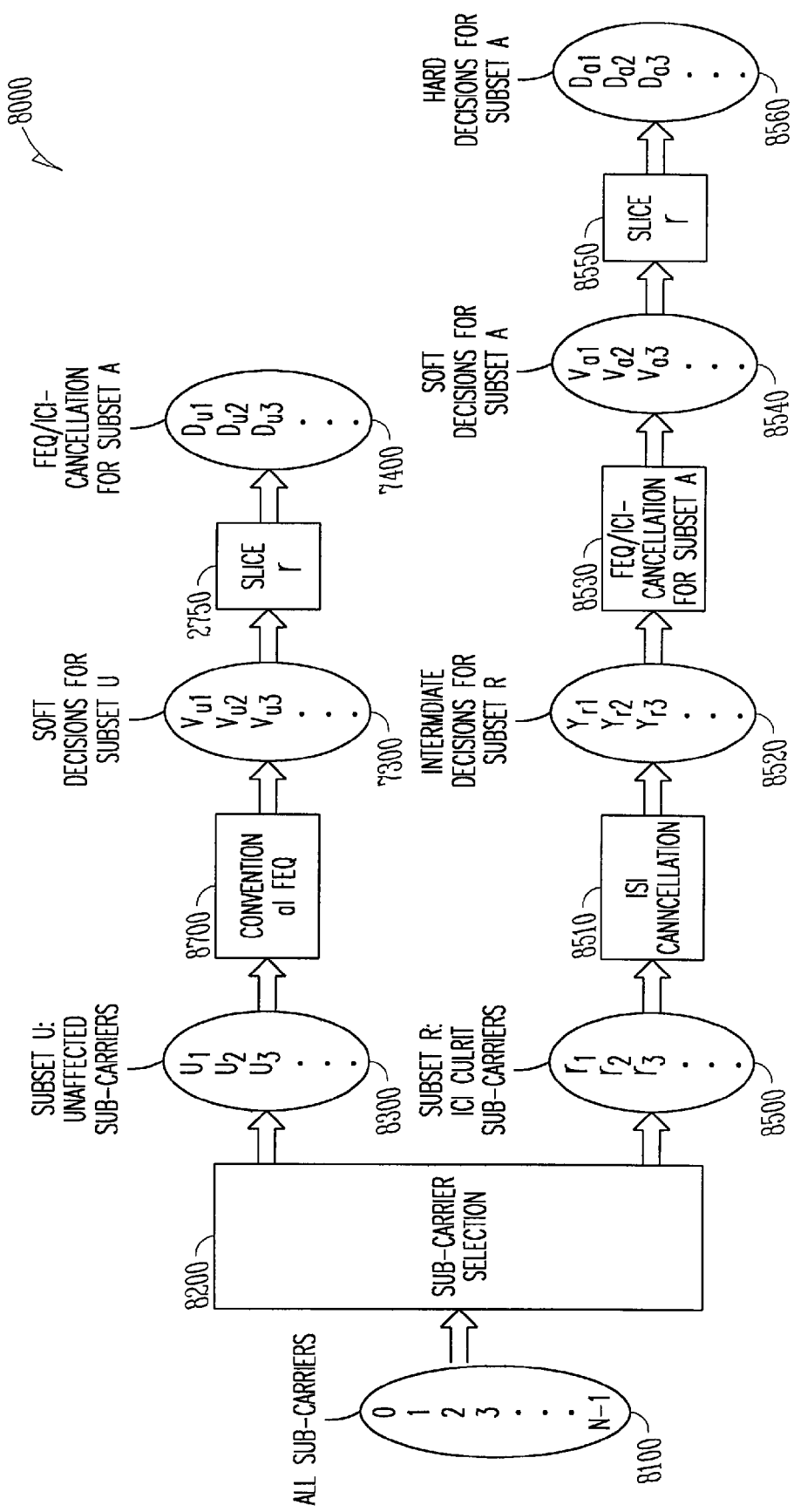
FIG. 8 illustrates a functional diagram of an exemplary FEQ/IC block according to some embodiments of the present invention.

FIG. 8 shows an exemplary functional description of an FEQ/IC block 8000 used in embodiments of the present invention. In FIG. 8, all tones in a particular DMT symbol are shown at block 8100. These tones are indicated as 0, 1, 2, 3, . . . , N−1. All tones in block 8100 are supplied to tone selection block 8200 where tone selection block 8200 selects a first subset of tones 8300 and a second subset of tones 8500 (described more fully below). The first subset of tones 8300 are identified as a list of tones of interest having negligible ISI and ICI. The indices of these tones form a subset U for unaffected tones, where U={$u_1, u_2, u_3$ . . . }. For each tone in the first subset of tones 8300, conventional FEQ 8700 is used to compensate the amplitude and phase change caused by transmission of the tones over the communication channel 2020. Mathematically, the following expression is used to describe the FEQ operation performed on the first subset of tones 8300:

$$V_n[k] = Y_n[k] \cdot F_n^*, \text{ for } n \in U \qquad \text{Equation 1}$$

In equation 1, $V_n[k]$ represents the soft decisions 7300, $Y_n[k]$ represents the raw decisions 7200 provided to FEQ/IC block, and $F_n$ is a complex scaling factor, which is also the coefficient of the conventional FEQ for tone n, and "*" denotes complex conjugate. This mathematical expression can be rephrased in English as meaning that the "soft decision" for tone n in subset U, which contains the tones of interest that have negligible ISI/ICI, is obtained by calculating the dot product between the "raw decision" and the FEQ coefficient of tone n. The soft decisions 7300 are provided to the slicer 2750, which in turn outputs hard decisions 7400.

Returning to FIG. 8, tone selection block 8200 also selects a second subset of tones 8500 which suffer from significant ISI/ICI. The second subset of tones 8500 are identified as a list of tones of interest having significant ISI and ICI and the indices of these tones form a subset A for affected tones, where A={$a_1, a_2, a_3$, . . . }. They are the "victims" of ISI/ICI. In practice, the subset A always comprises tones from one or more contiguous frequency bands. For example, for ADSL the subset A may be {40, 41, 42, . . . , 59}. For each tone n in A, we identify a list of tones from current DMT symbol that cause significant ICI to this tone n. These are the "culprits" of ICI to this tone n. Let the indices of these "culprit" tones for tone n form a subset M(n). Let the union of all subsets M(n) for all n in A form a superset R. Those tones in superset R are causing ICI to some tones in A. Note that every tone n in the subset A will also be in the superset R, since every tone in subset A will always cause ICI to its neighboring tone(s) that will also belong to the subset A since tones in A are always contiguous.

For each tone r in R, we identify a list of tones from previous DMT symbol that causes significant ISI to this tone r. They are the "culprits" of ISI to this tone r. Let the indices of these "culprit" tones form a subset P(r). We then perform ISI cancellation 8510 for each tone r. Mathematically, we use the following expression to describe the ISI cancellation:

$$Y'_r[k] = Y_r[k] - \sum_{p \in P(r)} D_p[k-1] \cdot S_{rp}^*, \text{ for } r \in R \qquad \text{Equation 3}$$

Here, $S_{rp}$ is a coupling coefficient between tone p of previous DMT symbol and tone r of current DMT symbol; "*" denotes complex conjugate; $Y_r[k]$ is the intermediate decision for tone r; $D_p[k-1]$ is the hard decision of tone p from previous DMT symbol; Y'r[k] is referred to as "intermediate decision" for tone r. This mathematical expression can be rephrased in English as the "intermediate decision" for tone r in superset R, which contains the tones that causes ICI to some tones of interest in subset A, is obtained from the "raw decision" of tone r, minus the dot product between the vector formed by the "hard decisions" corresponding to the tones in subset P(r) of the previous DMT symbol and an ISI vector.

Figure 9:
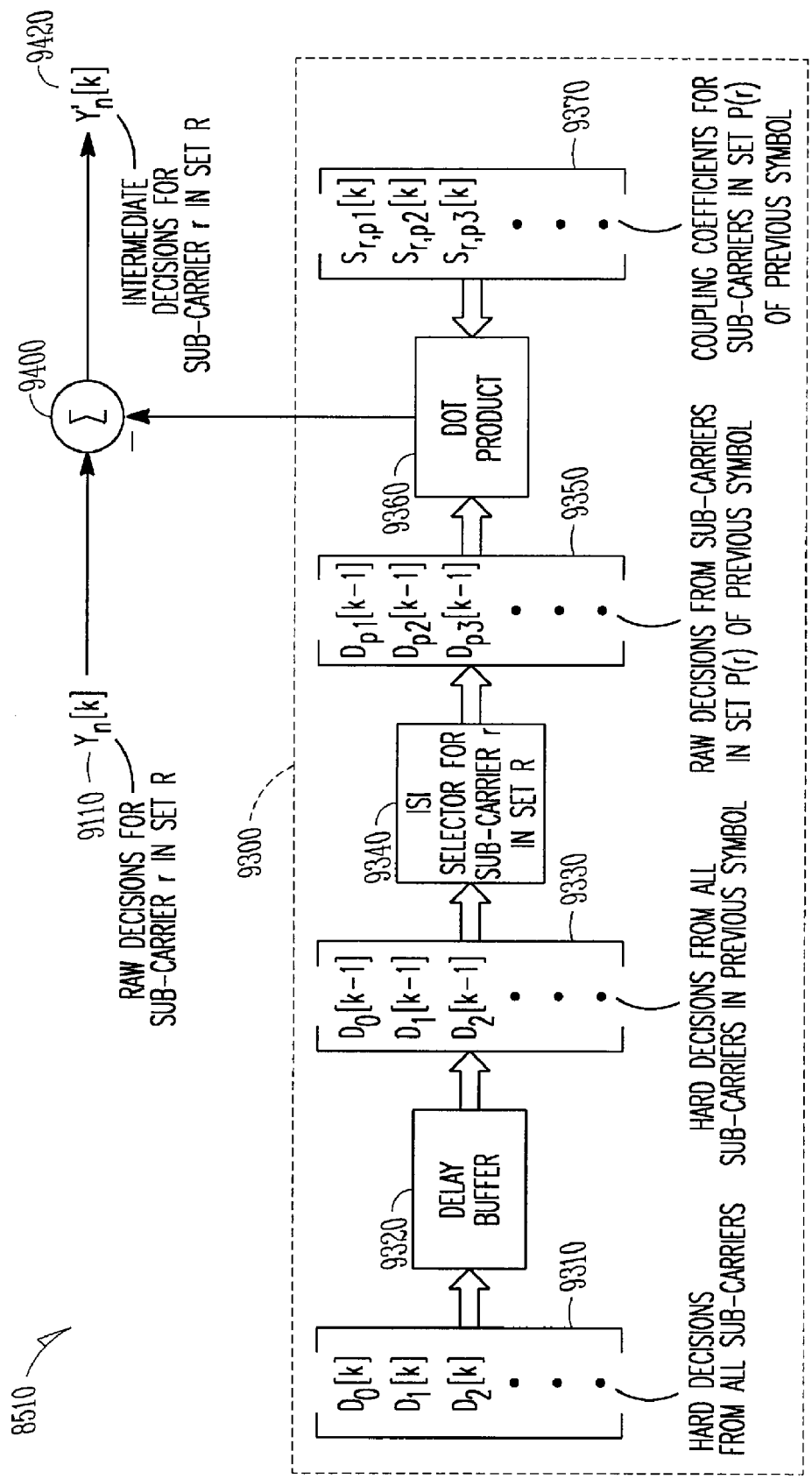
FIG. 9 is a flow chart describing an exemplary method of ISI operation according to some embodiments of the present invention.

The operation of ISI cancellation is illustrated graphically in FIG. 9. At block 9300, hard decisions from all tones 9310, labeled $D_0[k], D_1[k], D_2[k] \ldots$, are provided to delay buffer 9320. In various embodiments, hard decisions for all tones 9310 are provided as feedback from the output 8560 of slicer 8550, the output being from a previously received symbol. In addition, hard decisions for all tones 9310 may include hard decisions from a plurality of previously received symbols. In some embodiments, delay buffer 9320 includes memory to store the hard decisions for all tones 9310 from a previous symbol, or a plurality of previous symbols. At tone block 9330, hard decisions for all tones in a previous symbol, labeled $D_0[k-1], D_1[k-1], D_2[k-1] \ldots$, are provided to ISI selector for tone r in subset R, 9340. ISI selector for tone r in subset R 9340 provides raw decisions from tones in subset P(r) of a previous symbol 9350, labeled $D_{p1}[k-1], D_{p2}[k-1], D_{p3}[k-1], \ldots$, to dot product block 9360. In addition, coupling coefficients between tones r of the current symbol and tones in subset P(r) of a previous symbol 9370 are provided to dot product block 9360. Coupling coefficients between tones r and tones in subset P(r) of a previous symbol 9370 are described in more detail below. Dot product block 9360 generates an output at 9430 that is the dot product of raw decisions from tones in subset P(r) of a previous symbol 9350 and the coupling coefficients between tone r and tones in subset P(r) of a previous symbol 9370.

Summer 9400 receives at an input the raw decision for tone r in set R and receives at input 9430 the output from dot product block 9360. Summer 9400 produces an intermediate decision (soft decision), labeled $Y'_r[k]$ at output 9420. In some embodiments, output $Y'_r[k]$ represents a "soft decision" for tone n of symbol k after performing ISI cancellation on tone r. Those of ordinary skill in the art will recognize that a similar output may be generated for each tone r in a plurality of tones present in a particular symbol. In various embodiments, the output provided by summer 9400 is represented by Equation 3 presented above.

Mathematically, we use the following expression to describe the ISI operation:

$$V_n[k] = Y'_n[k] \cdot F_n^* - \sum_{m \in M(n)} Y'_m[k] \cdot C_{nm}^*, \text{ for } n \in A \qquad \text{Equation 4}$$

Here, Fn is a complex scaling factor, which is similar to the coefficient of the conventional FEQ for tone n; $C_{nm}$ is a coupling coefficient between tone m of current DMT symbol and tone n of current DMT symbol; also, "*" denotes complex conjugate. This mathematical expression can be rephrased in English as the "soft decision" 8540 for tone n in subset A, which contains the tones of interest that have non-negligible ISI/ICI, is obtained by calculating the dot product between the "intermediate decision" and the FEQ coefficient of tone n, minus the dot product between the vector formed by the "intermediate decisions" corresponding to the tones in subset M(n) and an ICI vector.

Referring back to FIG. 8, the output 9420 of summer 9400 is provided to an input of FEQ/ICI cancellation 8530 for a subset A. Once the "intermediate decisions" 8520 are obtained for those tones in R, we can perform the FEQ and ICI cancellation 8530 for each tone in A. For each tone n in A, we perform FEQ on its "intermediate decision" (which is readily available since tone n also belongs to the superset R) and also conduct ICI cancellation using the "intermediate decisions" for those tones in subset M(n).

Figure 10:
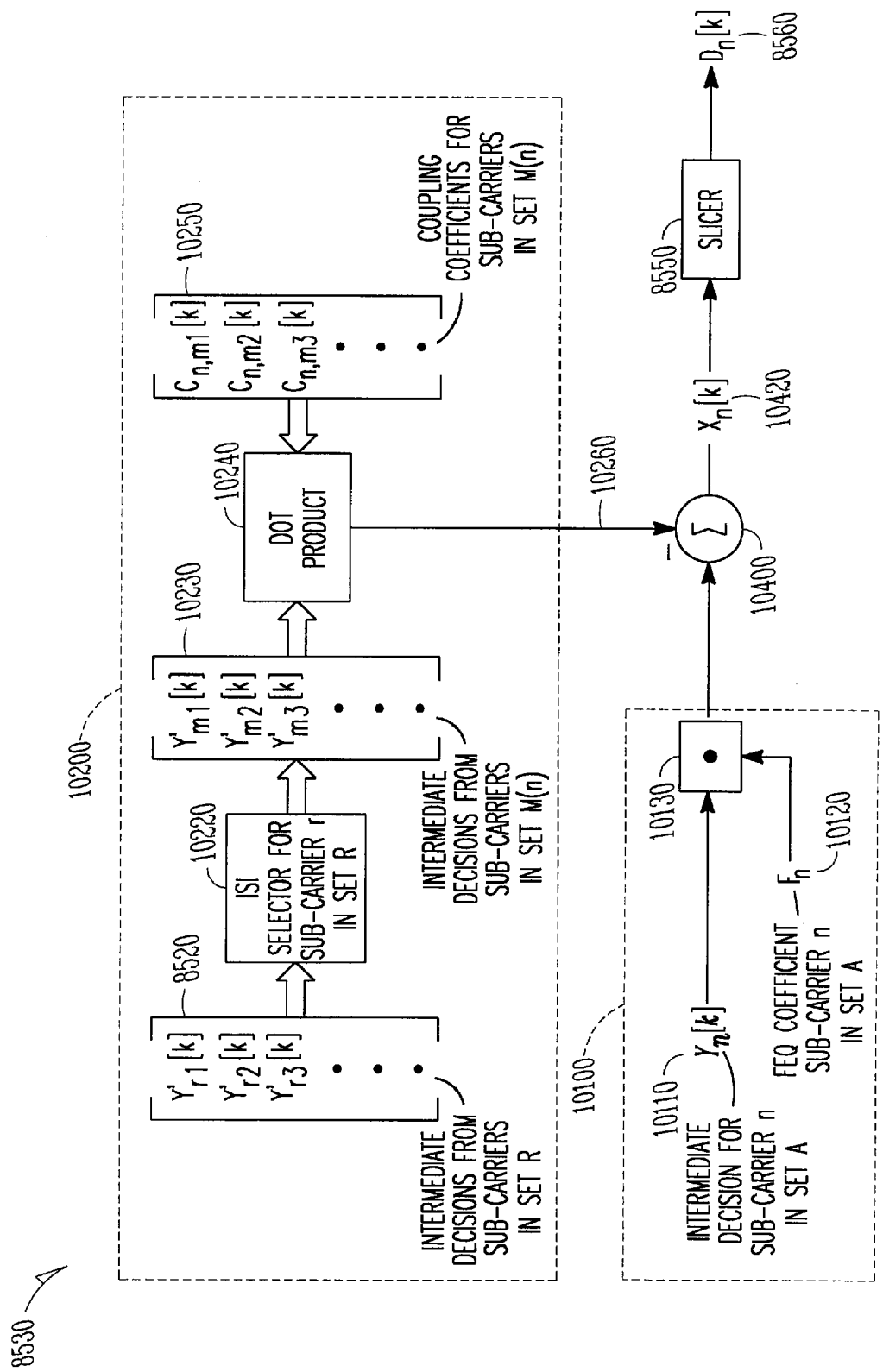
FIG. 10 is a flow chart describing an exemplary method of FEQ/ICI operation according to some embodiments of the present invention.

The operation of FEQ/ICI-cancellation is illustrated graphically in FIG. 10. At block 10100, intermediate decisions for tone n in subset A 10110, also referred to as the "affected tones," are provided to dot product block 10130. Intermediate decisions may be provided for example, by N-Point FFT 2700 of FIG. 7. FEQ coefficient $F_n$ for tone n in subset A 10120 is also provided to dot product block 10130. FEQ coefficient $F_n$ is described in further detail below. Dot product block 10130 provides at its output the dot product of the intermediate decisions for tone n in subset A (e.g., $Y'_r[k]$) 10110 and the FEQ coefficient $F_n$ for tone n in subset A 10120. In various embodiments, the output provided at output 10420 is calculated using Equation 1 as described above.

At block 10200, intermediate decisions for all tones 8520 are provided to ICI selector for tone n in subset A 10220. ICI selector for tone n in subset A determines a subset of tones, subset M(n), also referred to at "ICI culprit tones for tone n," from which ICI is to be cancelled from the intermediate decision of tone n. The selected tones are provided in intermediate decisions from tones in set M(n) block 10230, labeled as $Y'_{m1}[k], Y'_{m2}[k], Y'_{m3}[k] \ldots$, wherein m1, m2, m3, and so on, are indices of tones in subset M(n). The tones in tone block 10230 are provided to dot product block 10240. In addition, coupling coefficients between tone n and tones in subset M(n), labeled $C_{n,m1}[k], C_{n,m2}[k], C_{n,m3}[k] \ldots$ are also provided to dot product block 10240. Coupling coefficients between tone n and tones in subset M(n) are described in more detail below. Dot product block 10240 generates at output 10260 that is the dot product of the intermediate decisions from tones in subset M(n) 10230 and the coupling coefficients between tones n and tones in subset M(n) 10250.

Summer 10400 receives at an input the dot product 10260 and receives at an input the output from dot product block 10130. Summer 10400 produces an intermediate decision (soft decision), labeled $X_n[k]$ at output 10420. In some embodiments, output $X_n[k]$ represents a "soft decision" for tone n of symbol k after performing ICI cancellation on tone n. Those of ordinary skill in the art will recognize that a similar output may be generated for each tone n in a plurality of tones present in a particular symbol.

Referring back to FIG. 8 as well as FIG. 10, the output 10420 of FEQ/ICI cancellation 8530 provides soft decision for subset A 8540. The soft decisions 8540 are input to slicer 8550, which provides at output 8560, a hard decision, labeled $D_n[k]$, representing a hard decision of a constellation point for tone n of symbol k.

In various embodiments of the present invention, general guidelines for selecting the first subsets of tones, the subset U, "unaffected tones", and for selecting the second subset of tones the subset A, "affected tones" along with general guidelines for selecting the third subset M(n), ICI culprit tones for tone n, and a fourth subset P(n), ISI culprit tones for tone n, for each n of the second, or affected, tones, are described as follows.

In some embodiments, extensive simulation is used to determine which tones have negligible performance degradation due to ISI/ICI and which tones have significant performance degradation due to ISI/ICI. For each of those tones that are determined to have significant ISI/ICI and thus ISI/ICI cancellation is needed, a determination is made selecting a list of tones that are the major contributors of ISI/ICI. In some embodiments, the determination is made again using extensive simulation. In some embodiments, a determination is made of the trade-off between performance enhancement and implementation costs. In various embodiments, the following general guidelines are also used in selecting the subsets of tones:

1.) Interference is usually strongest from those tones that suffer less attenuation from the communication channel. In general, low frequency tones usually cause more interference to other tones than high frequency tones do. This is because low frequency tones usually suffer less attenuation from the communication channel. Since they are stronger in the receiver, their interference to other tones is also stronger.

2.) Interference is usually very strong where the response of the communication channel has a sharp transition in frequency.

3.) The ISI/ICI cancellation is usually needed only for the tones with high SNR (signal-noise ratio). For the tones with low SNR, the ISI/ICI cancellation does not make sense since other sources of impairment, e.g. thermal noises, usually dominate.

4.) The interference from neighboring tones and coupling from and to "empty" tones are usually strongest.

The following example using ADSL is included, not by way of limitation, but to illustrate the use of the general guidelines. However, those of ordinary skill in the art will recognize that the general principles depicted in this example are applicable to all MCM systems.

First, an examination is performed of the frequency response of the communication channel. ADSL utilizing a scheme called FDD (frequency domain duplex) to allow a simultaneous transmission of downstream and upstream traffics over the same pair of transmission lines. Downstream traffic is the signal transmission from central office or network node to the user's premises, while upstream traffic is the signal transmission from the user's premises to central office. FDD makes the simultaneous transmission possible by using two non-overlapping (or slightly over-lapping) frequency bands, one for downstream and one for upstream. For example, downstream traffic uses the frequency range from tone number 40 to tone number 255, while upstream traffic uses the frequency range from tone number 5 to tone number 32. In the receiver of the user's premises equipment, a high pass filter with a cut-off corner around tone number 36 is usually used to separate the downstream signal from the upstream signal that leaks to the receiver from the transmitter of the user's premises equipment. In this case, the frequency domain response of the communication channel for the downstream traffic has a sharp transition around tone number 36. Whenever there is a sharp transition in the frequency response of the communication channel, there is a rich coupling among the tones near the sharp transition. Also, the coupling is usually strongest among neighboring tones and empty tones. In this example, the subset A is selected as

A={38,39,40, . . . , 57} which correspond to the first twenty that are closest to the abrupt transition and also lowest in frequencies. In this example, the subset U is selected as

U={58,59,60, . . . , 255} which correspond to the tones that are away from the sharp transition and also high in frequencies (so that SNR is already low and therefore ISI/ICI cancellation does not help significantly).

For each tone n in A, we usually select its image tone, a few neighboring tones along with their images, and a few "empty" tones along with their images for doing ICI cancellation. For example, for tone number 40 (n=40), we may select the subset M(40) as $M(40)=\{35,36,37,38,39,41,42,N-42,N-41,N-40,N-39,$
$N-38,N-37,N-36,N-35\}$ Here, we select its image (N-40), four neighboring tones (38, 39, 41, 42) along with their images (N-38, N-39, N-41, N-42), and three "empty" tones (35, 36, 37) along with their images (N-35, N-36, N-37). Note that tones number 35, number 36 and number 37 are referred to as "empty" tones because there are not used in either upstream or downstream transmission. They are included in ICI cancellation, however, because there is a sharp transition in the frequency response near these tones and therefore a lot of useful information has been coupled to them. Also, they are low frequency tones that suffer less attenuation from the communication channel and thus are relatively strong in the receiver. Note that the "image" of tone n is tone N-n (N=512 for ADSL.).

The selection of the subset for doing ISI cancellation is similar to that for ICI cancellation. In ISI cancellation, the same tone n (but from the previous DMT symbol) along with its image, a few neighboring tones along with their images, and a few "empty" tones along with their images are selected. For example, for tone number 40, we may select the subset M(40) as $P(40)=\{35,36,37,38,39,40,41,42,N-42,N-41,N-40,N-$
$39,N-38,N-37,N-36,N-35\}$ Here, we select the same tone (40) along with its image (N-40), four neighboring tones (38, 39, 41, 42) along with their images (N-38, N-39, N-41, N-42), and three "empty" tones (35, 36, 37) along with their images (N-35, N-36, N-37). Note that tones number 35, number 36 and number 37 are referred to as "empty" tones because there are not used in either upstream or downstream transmission. The reason for selecting a few "empty" tones is because they contain rich information coupled to them due to sharp transition of response near them. It is worth pointing out, however, that the previous symbols from decision device are all zero because there was no signal inside. Thus tone number 35, number 36 and number 37 in subset P(40) of the aforementioned example are zero.

In an embodiment, the number of neighboring tone selected for either ICI or ISI cancellation can be different from tone to tone. Usually, the tones that are near the sharp transition of the frequency response, or the low frequency tones, need more neighboring tones for performing at least one of ICI cancellation and/or ISI cancellation. For example, we may need 4 neighboring tones for tone number 40 in doing ICI/ISI cancellation but only need 2 neighboring tone for tone number 59, since tone number 40 is closer to the transition and suffers more ICI/ISI, and also is higher in SNR thus these tones gain more from ICI/ISI cancellation.

Following the aforementioned guideline, we can make selection for tones in U, A, M(n), and P(n) once the system duplex scheme, and a general idea about the communication channel are known. Therefore, the selection can always be made upfront and the results can be stored in look-up tables.

In an embodiment, the coefficients for FEQ coefficient $F_n$, ICI coupling coefficients $C_{nm}$, and ISI coupling coefficient $S_{np}$, for tone n in subset A are chosen such as to minimize the mean square error between its "soft decision" $V_n[k]$ and "hard decision" $D_n[k]$. The methods for obtaining these coefficients are described in U.S. Ser. No. 11/256,707 filed Oct. 24, 2005, titled "Inter-Symbol and Inter-Carrier Interference Canceller for Multi-Carrier Modulation Receiver," which is incorporated by reference for any purpose. The '707 application describes using LMS (least mean square) or RLS (recursive least square) schemes. Instead of using the LMS (least mean square) method to adaptively obtain the ICI/ISI coupling coefficients, an embodiment of the present invention derives these coefficients based on system identification.

In a typical MCM system, there is a training phase where the remote transmitter is sending a pre-known, deterministic, and mostly simple information. The training phase allows the local receiver to perform system identification to estimate the impulse response of the communication channel. The method and procedure for estimating the CIR (channel impulse response) is system dependent. However, for those skilled in the art, the CIR can be estimated and written as a column vector c of length $L_p+L_c+1$:

$$c = [c_{-L_p} \ldots c_{-2} c_{-1} c_0 c_1 c_2 \ldots c_{L_c}]^T \quad \text{Equation 5}$$

The procedure of deriving the ICI/ISI coefficients based on CIR is now described.

1. Let the frequency domain data at the input of FFT 1300 (FIG. 1) of the transmitter be written as a vector X of length N:

$$X[k] = [X_0[k] X_1[k] X_2[k] \ldots X_{N-1}[k]]^T \quad \text{Equation 6}$$

Here, k is DMT symbol index, and the superscript "T" denotes transpose.

2. The operation of IFFT 1300 can be expressed as a matrix operation on the vector X[k]. The matrix for representing the N-point IFFT operation is $W^*/N$, where "*" denotes a complex conjugate and the elements for matrix $W^*$ are $W^*_{k,l} = \exp(-2\pi j \cdot k \cdot l/N)$, for $0 \leq k, l \leq N$.

3. The operation of adding cyclic prefix (CP) (1400 in FIG. 1) can be expressed as a matrix operation. Let the length of CP be L, then the matrix operation of CP can be expressed as:

$$A = \begin{bmatrix} 0_{L \times (N-L)} I_L \\ I_N \end{bmatrix}$$

Here, $0_{L \times (N-L)}$ denotes an L by (N−L) zero matrix, and $I_N$ denotes an N by N identity matrix.

4. The effects of DAC 1600 and amplifier 1700 of the transmitter 1000, the transmission medium 2020, amplifier 2050, filter 2100, ADC 2200, and TEQ 2300 of the receiver 2000 can be combined and represented by a communication channel having a impulse response c. Define CIR (channel impulse response) matrices $C_0$ and $C_1$ as:

$$C_0 = \begin{bmatrix} 0 & \cdots & 0 & c_{L_c} & \cdots & c_1 \\ \vdots & \ddots & & \ddots & \ddots & \vdots \\ 0 & \cdots & 0 & \cdots & 0 & c_{L_c} \\ 0 & \ddots & & \ddots & & 0 \\ \vdots & \ddots & & \ddots & \ddots & \vdots \\ 0 & \cdots & \cdots & 0 & \cdots & 0 \end{bmatrix},$$

$$C_1 = \begin{bmatrix} c_0 & c_{-1} & \cdots & c_{-L_p} & \cdots & 0 \\ \vdots & \ddots & \ddots & & \ddots & \vdots \\ c_{L_c-1} & \cdots & c_0 & c_{-1} & \cdots & c_{-L_p} \\ c_{L_c} & \ddots & & & \ddots & \vdots \\ 0 & \ddots & \ddots & \cdots & \ddots & c_{-1} \\ 0 & 0 & c_{L_c} & c_{L_c-1} & \cdots & c_0 \end{bmatrix}$$

5. The operation of removing CP (2500 in FIG. 3) can also be expressed as a matrix operation. The matrix can be expressed as:

$$R = [0_{L \times L} I_N]$$

6. The operation of FFT 2600 can be represented by a matrix operation W, with elements $W_{k,l} = \exp(2\pi \cdot k \cdot l/N)$, for $0 \leq k, l \leq N$.

7. Let the effective additive noise to the receiver at the output of FFT 2600 of the receiver be written as a vector Z of length N:

$$Z[k] = [Z_0[k] Z_1[k] Z_2[k] \ldots Z_{N-1}[k]]^T$$

8. Let the output of FFT 2600 be represented by a column vector Y of length N:

$$Y[k] = [Y_0[k] Y_1[k] Y_2[k] \ldots Y_{N-1}[k]]^T$$

Then Y[k] is related to X[k], X[k−1], W, C0, C1, and Z[k] via the following relation:

$$Y[k] = WR[C_0 \quad C_1] \begin{bmatrix} A \times W^*/N & 0 \\ 0 & A \times W^*/N \end{bmatrix} \begin{bmatrix} X[k-1] \\ X[k] \end{bmatrix} + Z[k]$$

We may further simplify the above expression to $$Y[k] = W_N [\tilde{C}_0 \quad \tilde{C}_1] \begin{bmatrix} W^*/N & 0 \\ 0 & W^*/N \end{bmatrix} \begin{bmatrix} X[k-1] \\ X[k] \end{bmatrix} + Z[k]$$

$$= W\tilde{C}_1 W^*/N X[k] + W\tilde{C}_0 W^*/N X[k-1] + Z[k]$$

$$= (\text{signal \& } ICI) + ISI + \text{noise.}$$

Here, we define two matrices:

$$\tilde{C}_i = R \times C_i \times A = [0_{N \times L} \quad I_N] \times C_i \times \begin{bmatrix} 0_{L \times N-L} I_L \\ I_N \end{bmatrix}, i = 0, 1$$

In our receiver, we use hard decisions from previous DMT symbol, i.e., D[k−1], as the most likely estimate of X[k−1]. The ISI coupling coefficients ($S^*_{rp}$ mentioned above) can thus be obtained from the matrix $G = W\tilde{C}_0 W^*/N$, i.e. $S_{rp}^* = G_{rp}$.

As mentioned above, by applying ISI cancellation, we obtain "intermediate decisions" Y'n from "raw decisions" Yn. Mathematically, we have $$Y'[k] = Y[k] - S^*D[k-1]$$
$$\cong W\tilde{C}_1 W^*/N\, X[k] + Z[k]$$
$$= (\text{signal \& } ICI) + \text{noise}.$$

Based on the "intermediate decisions," which are almost free of ISI, we apply FEQ and ICI cancellation to obtain the "soft decisions" $V_n$.

$$V[k] = HY'[k]$$

where the diagonal elements of the matrix H are the complex conjugate of FEQ coefficients ($F_n$ mentioned above) and the off-diagonal elements of the matrix H are the negative complex conjugate of the ICI coupling coefficients ($C_{nm}$ mentioned above). The FEQ coefficients $F_n$ and ICI coupling coefficients $C_{nm}$ are chosen so as to minimize the mean square error between soft decisions V[k] and ideal decisions X[k], i.e. to minimize the mean square magnitude of the following vector $$E[k] = X[k] - V[k] = X[k] - H(W\tilde{C}_1 W^*/N\, N[k] + Z[k])$$

Note that row n of H, denoted as Hn, consists of the FEQ coefficient and ICI cancellation coefficients for tone n. To minimize the mean square error for tone n, we need to minimize the mean square of the following quantity $$e_n[k] = X_n[k] - V_n[k] = X_n[k] - H_n(W\tilde{C}_1 W^*/N X[k] + Z[k])$$

We can derive the statistical mean square error for tone n as follows:

$$\begin{aligned}
J_n &= E\{e_n[k]e_n^H[k]\} \\
&= E\{X_n[k]X_n^*[k]\} - E\{X_n[k]X^H[k]\}W\tilde{C}_1^T W^*/N\, H_n^* - \\
&\quad E\{X_n[k]Z^H[k]\}H_n^H - H_n W \tilde{C}_1\, W^*/N\, E\{H[k]X_n^*[k]\} + \\
&\quad H_n W \tilde{C}_1 W^*/N\, E\{X[k]X^H[k]\}W\tilde{C}_1^T W^*/N\, H_n^H + \\
&\quad H_n E\{Z(n)Z^H(n)\}H_n^H.
\end{aligned}$$

Here, "*" denotes complex conjugate and the superscript "$H$", denotes "Hermitian" (complex conjugate and transpose).

In practice, both signal and noise are cyclo-stationary, i.e., the statistical properties are the same from symbol to symbol. Let the mean square value of $X_n$ be $\sigma_{x,n}^2$, then the matrix $R_{XX} = E\{X[k]X^H[k]\}$ is a diagonal matrix with the only non-zero element in row n being $\sigma_{x,n}^2$. Let $R_{ZZ} = E\{Z[k]Z^H[k]\}$. Then the mean square error $J_n$ can be written as $$\begin{aligned}
J_n &= \sigma_{x,n}^2 - [0\; \cdots\; 0\; \sigma_{x,n}^2\; 0\; \cdots\; 0]W\tilde{C}_1^T W^*/N\, H_n^H - \\
&\quad H_n W \tilde{C}_1 W^*/N[0\; \cdots\; 0\; \sigma_{x,n}^2\; 0\; \cdots\; 0]^T + \\
&\quad H_n W \tilde{C}_1\, W^*/N R_{XX} W_N \tilde{C}_1^T\, W^*/N\, H_n^H + \\
&\quad H_n R_{ZZ} H_n^H.
\end{aligned}$$

Here, $[0\, \ldots\, 0\, \sigma_{x,n}^2\, 0\, \ldots\, 0]$ is a row vector with only one non-zero element $\sigma_{x,n}^2$ at column n.

By solving the partial differential equation $\partial J_n/\partial_n^* = 0$, or by applying the orthogonality principle, i.e. $E\{Y'[k]e_n^H[k]\} = 0$, we obtain the following relation:

$$H_n(W\tilde{C}_1 W^*/NR_{XX}W\tilde{C}_1^T W^*/NR_{ZZ}) = [0\ldots 0\sigma_{x,n}^2 0 \ldots 0]W\tilde{C}_1^T W^*/N.$$

We thus obtain the FEQ coefficient and the ICI coupling coefficients for tone n as:

$$H_n = [0\ldots 0\sigma_{x,n}^2 0\ldots 0]W_N \tilde{C}_1^T W_N^*/N \times (W_N\tilde{C}_1 W_N^*/NR_{XX}W_N\tilde{C}_1^T W_N^*/NR_{ZZ})^{-1}.$$

The coefficients for FEQ coefficient $F_n$, ICI coupling coefficients $C_{nm}$ for tone n are thus obtained from the row vector Hn. Note that $\sigma_{x,n}^2$ and thus $R_{XX}$ are pre-known, while $R_{ZZ}$, the noise correlation matrix, can be measured during training sequence where the exact transmit symbols are known and noises are easily characterized.

Aforementioned ISI cancellation uses hard decisions generated from a slicer. Sometimes, however, we prefer to use alternative decisions. In some cases, the MCM system has a training phase, during which the receiver readily knows the exact DMT symbols transmitted from the transmitter. In this case, we can use the exact, readily known constellation point for each tone to replace the respective hard decision. Also, some MCM systems use advanced forward error correction schemes (e.g. trellis code modulation) to improve the performance of DMT symbol detection. In this case, we may use the detection results from the corresponding decoder (e.g. Viterbi decoder) to replace the hard decisions.

Thus far we show the scheme for canceling the ISI from the previous DMT symbol. For those skillful in the art, it is straightforward to expand it to cancel the ISI from more than one preceding DMT symbols. In general, to cancel the ISI from symbol (k−p) (p symbols earlier, where p is a positive integer) to symbol k (current symbol) for tone n in A, we first select a subset of tones based on aforementioned rules (sharp transition in frequency response, neighboring tones, empty tones, and so on). When calculating the "soft decision," we need to minus a term obtained from the dot product between the vector formed by the "hard decisions" of tones corresponding to that subset from p DMT symbols earlier and an ISI vector. The ISI vector, of course, depends on the values of p. The coefficients within the ISI vector can also be obtained using the LMS method. In real life, however, it is not necessary to consider ISI for more than one DMT symbols.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of receiving multi-carrier data, the method comprising:
   receiving a frame based frequency domain data comprising N elements, N being a positive integer, each representing a modulation onto a certain sub-carrier;
   selecting a first subset U among the N elements and performing equalization for each element u in U to obtain a first group of soft decisions;
   selecting a second subset A among the N elements;
   selecting a third subset R among the N elements, the third subset R representing a plurality of sub-carriers that cause substantial inter-carrier interference to at least part of the sub-carriers in the second subset A;
   selecting a fourth subset P among the N elements from a previous frame, the fourth subset P representing a plurality of sub-carriers from the previous frame that cause substantial inter-symbol interference to at least part of the sub-carriers in the third subset R;
   performing inter-symbol interference cancellation for the sub-carriers in the third subset R to produce a plurality of intermediate decisions;
   performing both equalization and inter-carrier interference cancellation for each element a in the second subset A using said intermediate decisions to obtain a second group of soft decisions.

2. The method of claim 1, wherein performing equalization for each element u in U further comprises multiplying the element u with an equalization coefficient.

3. The method of claim 1, wherein performing both equalization and inter-carrier interference cancellation for each element a in subset A further comprises computing a linear combination of said intermediate decisions.

4. The method of claim 1, making most likely decisions from the first group of soft decisions to generate a first group of hard decisions and making most likely decisions from the second group of soft decisions to generate a second group of hard decisions.

5. The method of claim 4, further comprising: storing the second group of hard decisions from the previous frame.

6. The method of claim 5, wherein performing the inter-symbol interference cancellation further comprises: for each element r in subset R, subtracting a respective linear combination of a part of the second group of hard decisions stored from the previous frame, the part of the second group of hard decisions corresponding to the sub-carriers in the fourth subset P.

7. The method of claim 6, wherein performing both equalization and inter-carrier interference cancellation for each element a in second subset further comprises obtaining coefficients for the linear combination during an initial training phase.

8. The method of claim 7, wherein obtaining during an initial training includes deriving the coefficient based on system identification.

9. The method of claim 6, wherein performing the inter-symbol interference cancellation further comprises obtaining coefficients for the linear combination during an initial training phase.

10. The method of claim 9, wherein obtaining coefficients during an initial training includes deriving the coefficient based on a system identification.

11. A multi-carrier modulation device, comprising:
    a receiver including a front-end, a sub-carrier selector, an equalizer and an interference canceller;
    the front-end configured to receive a frame-based multi-carrier signal including a plurality of sub-carriers;
    the sub-carrier selector configured to generate a first subset of sub-carriers, a second subset of sub-carriers, a third subset of sub-carriers for each element in the second subset of sub-carriers, and a fourth subset of sub-carriers for each element in the third subset of sub-carriers;
    the equalizer receiving the first subset of sub-carriers and outputting a first group of soft decisions; and
    the interference canceller including:
       an inter-symbol interference canceller for receiving the fourth subset of sub-carriers and outputting a plurality of intermediate decisions for the third subset of sub-carriers, and
       a combined inter-carrier interference canceller and equalizer for receiving said intermediate decisions and for outputting a second group of soft decisions.

12. The device of claim 11, wherein the receiver further includes a decision device configured to make most likely decisions from the first group of soft decisions to generate a first group of hard decisions.

13. The device of claim 12 wherein the interference canceller further includes a further decision device configured to generate a second group of hard decisions from the second group of soft decisions based on making most likely decisions.

14. The device of claim 13, wherein the first subset of sub-carriers comprises a plurality of sub-carriers that are not substantially affected by inter-symbol or inter-carrier interference, the second subset of sub-carriers comprises a plurality of sub-carriers that are substantially affected by inter-symbol or inter-carrier interference, the third subset of sub-carriers comprises a plurality of sub-carriers that cause substantial inter-carrier interference to at least part of the second subset of sub-carriers, and the fourth subset of sub-carriers comprises a plurality of sub-carriers that cause substantial inter-symbol interference to at least part of the third subset of sub-carriers.

15. The device of claim 14, further comprising a buffer to store the second group of hard decisions from a previous frame.

16. The device of claim 15, wherein the combined inter-carrier interference canceller and equalizer computes a linear combination of said intermediate decisions for each element in the second subset of sub-carriers.

17. The device of claim 16, wherein the inter-symbol interference canceller computes a subtraction of a linear combination of the fourth subset of sub-carriers from the previous frame for each element in the third subset of sub-carriers.

18. A system comprising
a communication channel having two ends and having a frequency response that comprises at least one frequency band;
a transmitter coupled to one end of the communication channel, the transmitter being configured to generate a frame-based, multi-carrier modulation signal, the signal including a plurality of sub-carriers utilized to transmit information;
a receiver coupled to the other end of the communication channel, the receiver including an equalizer and an interference canceller for generating a plurality of soft decisions, the equalizer and the interference canceller being in a same path;
wherein the equalizer and interference canceller is adapted to receive said plurality of sub-carriers, and to determine among said plurality of sub-carriers a first subset of sub-carriers that are close to being orthogonal to one another, a second subset of sub-carriers that are far from being orthogonal to one another, a third subset of sub-carriers that cause interference to at least part of the second subset of sub-carriers, and a fourth subset of sub-carriers from a previous frame that cause interference to at least part of the third subset of sub-carriers, and based on this determination setting at least one of an equalization coefficient, an inter-symbol interference cancellation coefficient and an inter-carrier cancellation coefficient.

19. The system of claim 18, wherein the first subset of sub-carriers includes sub-carriers that are at least a number of sub-carriers away from a transition band between two non-overlapping frequency bands or a transition edge in the frequency response of the communication channel.

20. The system of claim 19, wherein the second subset of sub-carriers includes one or more sub-carriers that are in proximity of the transition band between two non-overlapping frequency bands or a transition edge in the frequency response of the communication channel.

21. The system of claim 18 further including a decision device adapted to receive said soft decisions and to make most likely decisions from the soft decisions to generate accordingly a plurality of hard decisions.

22. The system of claim 21, further comprising a buffer to store said hard decisions from the previous frame.

23. The system of claim 18, wherein the equalizer and interference canceller processes each of element in the first subset by multiplying an equalization coefficient.

24. The system of claim 18, wherein the equalizer and interference canceller further generates a plurality of intermediate decisions by subtracting from each element in the third subset of sub-carriers a linear combination of the hard decisions of the fourth subset of sub-carriers from the previous frame.

25. The system of claim 24, wherein the equalizer and interference canceller further processes each element in the second subset of sub-carriers by performing a linear combination of said intermediate decisions.

* * * * *